United States Patent [19]
Crawford et al.

[11] Patent Number: 5,119,894
[45] Date of Patent: Jun. 9, 1992

[54] WEIGHING APPARATUS FOR WEIGHING THE CONTENTS OF A REFUSE CONTAINER AND METHOD

[75] Inventors: Charles D. Crawford, Burlington; John T. Prout, Winston Salem; James A. King, Jr., Stoneville, all of N.C.; Fleming W. Atkin, Bluffton, S.C.

[73] Assignee: Toter, Inc., Statesville, N.C.

[21] Appl. No.: 657,647

[22] Filed: Feb. 19, 1991

[51] Int. Cl.⁵ .............................. G01G 19/00
[52] U.S. Cl. ........................... 177/145; 177/139; 177/211
[58] Field of Search ............... 177/139, 229, 145, 211

[56] References Cited

U.S. PATENT DOCUMENTS

| | | | |
|---|---|---|---|
| 4,323,132 | 4/1982 | Bradley | 177/139 |
| 4,421,186 | 12/1983 | Bradley | 177/139 |
| 4,486,136 | 12/1984 | Howard | 177/211 |
| 4,714,122 | 12/1987 | Appleton et al. | 177/139 |
| 4,771,837 | 9/1988 | Appleton et al. | 177/139 |
| 4,809,794 | 3/1989 | Blair et al. | 177/139 |
| 4,854,406 | 8/1989 | Appleton et al. | 177/139 |
| 4,919,222 | 4/1990 | Kyrtsos et al. | 177/139 |
| 5,038,876 | 8/1991 | Smith | 177/139 |

OTHER PUBLICATIONS

Publication: "The Weigh Bar Principle of Operation", -undated.
Publication: "Radio Frequency (RF) Identification", -Oct. 1989.

Primary Examiner—Joseph W. Hartary
Assistant Examiner—Randy W. Gibson
Attorney, Agent, or Firm—W. Thad Adams, III

[57] ABSTRACT

A weighing apparatus for determining the weight of a load while the load is in vertical motion, comprising a stationary support, a lifter for lifting and lowering the load thorough a range of vertical motion, and at least three elongate weigh beams secured to the stationary support and the lifter by respective opposite ends thereof and rigidly spacing the lifter horizontally from the stationary support. The weigh beams sense the weight of the load continuously while the load is in motion. A computer is operatively connected to the weigh beams for receiving and processing weight information sensed by the weigh beams and outputting data representative of the weight of the load. A first weight is sensed representing the container and refuse contained in the container. A second weight is sensing after the container has been emptied and subtracted from the first weight to derive a net weight representing the weight of the emptied refuse. The lifter includes a reader for reading data from an identity tag carried by refuse containers to be emptied.

18 Claims, 11 Drawing Sheets

WEIGHING APPARATUS FOR WEIGHING THE CONTENTS OF A REFUSE CONTAINER AND METHOD

TECHNICAL FIELD AND BACKGROUND OF THE INVENTION

This invention relates to a weighing apparatus and method for determining the weight of a load while the load is in motion. The invention permits the contents of a refuse container, for example a "roll-out" refuse container, to be quickly weighed with extreme accuracy while the container is being emptied. The disclosure of this application relates specifically to weighing of refuse in a refuse container, but has many other applications.

Typical roll-out refuse collection takes place by driving a collection truck along a collection route. On specified days residents roll wheeled containers to be emptied to the street.

Collection workers move the curbside containers onto a lift unit carried by the truck. Upon actuation the lift unit moves the container vertically and horizontally through a range of motion while inverting the container into the truck hopper. The lift operator may "bang" the container at the top of the cycle to dislodge contents. The lift unit is reversed and the container lowered. The container is removed from the lift unit. The truck moves to the next container and the process is repeated.

In commercial and industrial environments, special trucks empty the containers from and return the empty containers to their usual position.

While the term "refuse container" is used throughout this application, the term is used in its broad sense to mean many types of containers such as recycling containers, drums and similar products. The term "contents" is used to refer to what is emptied from the refuse containers, whether "refuse" in the strict sense, or recycling materials or other material.

Recent recognition of the importance of recycling and the expense of disposing of household and business refuse have created a demand for more up-to-date methods and practices of refuse collection and disposal. Some municipalities and business concerns have begun instituting programs to encourage conservation and recycling by charging for refuse collection and paying for recyclables based upon the weight collected for disposal. So far as is known, some systems for doing this are in development and are believed to involve raising a refuse container off of the ground, stopping the lifter to permit the container to achieve a state of equilibrium necessary to factor out inertia, momentum, acceleration and similar phenomena, weighing the container, emptying the contents, and either subtracting from the measured weight of the container an assumed standard weight of an empty container, or repeating the process of bringing the container to a stop during lowering of the container to obtain an empty weight while the container is in an equilibrium condition.

There are difficulties with both of the above approaches. Merely subtracting a standard empty container weight from the loaded weight does not take into account that in many instances some refuse may be left in the container because of jamming or sticking and not emptied When this happens, the customer is charged for refuse not collected at each collection for as long as the stuck refuse remains in the container, as well as when the refuse is later actually emptied.

Weighing the container while lifting and again while lowering takes into account refuse which may be left in the container. However, bringing the container to a stop twice during each cycle greatly increases the time required to empty a container and hence the efficiency of the entire process. Furthermore, it is believed that conventional weighing devices and processes cannot accurately compensate for the wide range of dynamic conditions which are necessarily encountered along a refuse collection route.

There are other considerations as well. Since a customer is being charged based on the weight of the contents being emptied, it is important to accurately associate a particular container with a particular account—typically a residence or business address. In order to maintain efficiency and to accommodate typical skill levels applicable to refuse collection workers, it is important to make as much of the weighing and container identification process and subsequent matching of data automatic and therefore transparent to the collection workers.

The invention described in this application addresses these problems by use of technology which provides reliability, extremely accurate results, durability even under extreme weather and use conditions, and operation which, from the operator vantage point, is the same as conventional emptying without weighing.

SUMMARY OF THE INVENTION

Therefore, it is an object of the invention to provide a weighing apparatus for determining the weight of a load while the load is in motion.

It is another object of the invention to provide a weighing apparatus for determining the weight of a load while the load is in vertical and/or horizontal motion.

It is another object of the invention to provide a weighing apparatus particularly adapted for weighing the contents of a refuse container before emptying the container.

It is another object of the invention to provide a weighing apparatus which includes means for receiving electrical inputs from the weigh beams representative of the weight of the refuse container, determining from the electrical inputs the weight of the refuse container during a lifting motion, determining the weight of the refuse container during a lowering motion after contents has been emptied therefrom, subtracting the weight of the refuse container while being lowered from the weight of the refuse container while being lifted and outputing data representative of the net weight of the contents emptied from the refuse container.

It is another object of the invention to provide a weighing apparatus which includes means for reading data from an identity tag carried by refuse containers to be emptied.

These and other objects of the present invention are achieved in the preferred embodiments disclosed below by providing a weighing apparatus for determining the weight of a load while the load is in motion, comprising a stationary support, a lifter for lifting and lowering the load thorough a range of motion, and weight sensing means preferably comprising at least three elongate weigh beams secured to the stationary support and the lifter by respective opposite ends thereof and rigidly spacing the lifter horizontally from the stationary support. The weigh beams sense the weight of the load continuously while the load is in motion. Computing means are operatively connected to the weigh beams for receiving and processing weight information sensed by the weigh beams and outputing data representative of the weight of the load.

According to one preferred embodiment of the invention, the weigh beams are spaced from one another on the stationary support in a triangular configuration.

According to another preferred embodiment of the invention, the lifter comprises a refuse container lifter for receiving, lifting, inverting, emptying contents from and lowering a refuse container, and wherein the lifter moves the refuse container through a range of simultaneous vertical and horizontal motion during the lifting and lowering motions.

According to yet another preferred embodiment of the invention, the computing means comprises means for receiving electrical inputs from the weigh beams representative of the weight of the refuse container, determining from the electrical inputs the weight of the refuse container during lifting vertical motion, determining the weight of the refuse container during vertical lowering motion after contents has been emptied therefrom, subtracting the weight of the refuse container while being lowered from the weight of the refuse container while being lifted and outputting data representative of the weight of the contents emptied from the refuse container.

According to one preferred embodiment of the invention, switching means activate the computing means to select only a predetermined portion of weight samples during the lifting and lowering of the refuse container, during which lifting and lowering, numerous weight samples are taken.

Preferably, the switching means comprises a proximity switch positioned on the lifter to detect proximity of a component of the lifter positioned to be in proximity to the proximity switch during the portion of the lifting and lowering cycle during which the computing means is intended to be operative.

According to one preferred embodiment of the invention, the lifter includes a pair of actuator arms for moving a container support plate responsive to movement of a prime mover, and the proximity switch is positioned to detect proximity of one of the actuator arms through a predetermined range of movement thereof.

According to another preferred embodiment of the invention, refuse container identifying means are carried by the lifter for correlating a particular refuse container being emptied with a customer account.

Preferably, the refuse container identifying means comprises a data reader for reading data from a identity tag carried by refuse containers to be emptied, and the computing means includes means for receiving data from the data reader. The data is stored with the time and date of the dump and later transmitted to a remote computer where it is compared against a data bank of customer information. Weight information is associated with a customer account.

Preferably, the computing means samples the weight of the refuse container continuously to determine a value representing multiple weight samples and divides the value by the number of samples taken to determine a weight value.

An embodiment of the method according to the invention comprises the steps of providing sensing means for sensing the weight of the load continuously while the load is in motion, lifting and lowering the load thorough a range of vertical motion, receiving and processing weight information sensed by said weigh beams and outputting data representative of the net weight of the load.

According to one preferred embodiment of the invention, the step of lifting and lowering the load comprises moving the refuse container through a range of simultaneous vertical and horizontal motion during the lifting and lowering motions.

According to another preferred embodiment of the invention, the step of receiving and processing weight information comprises providing electrical inputs from said weigh beams representative of the weight of the refuse container, determining from said electrical inputs the weight of the refuse container during lifting vertical motion, determining the weight of the refuse container during vertical lowering motion after contents has been emptied therefrom, subtracting the weight of the refuse container while being lowered from the weight of the refuse container while being lifted and outputting data representative of the weight of the contents emptied from the refuse container.

According to another preferred embodiment of the invention, the method includes the step of correlating a particular refuse container being emptied with a customer account, and the step of correlating a particular refuse container with a customer account comprises reading data from an identity tag carried by refuse containers to be emptied, receiving data from said data reader, comparing said data against a data bank of customer information and associating weight information with a customer account.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE DESCRIPTION OF REFUSE CONTAINER

Figure 1:
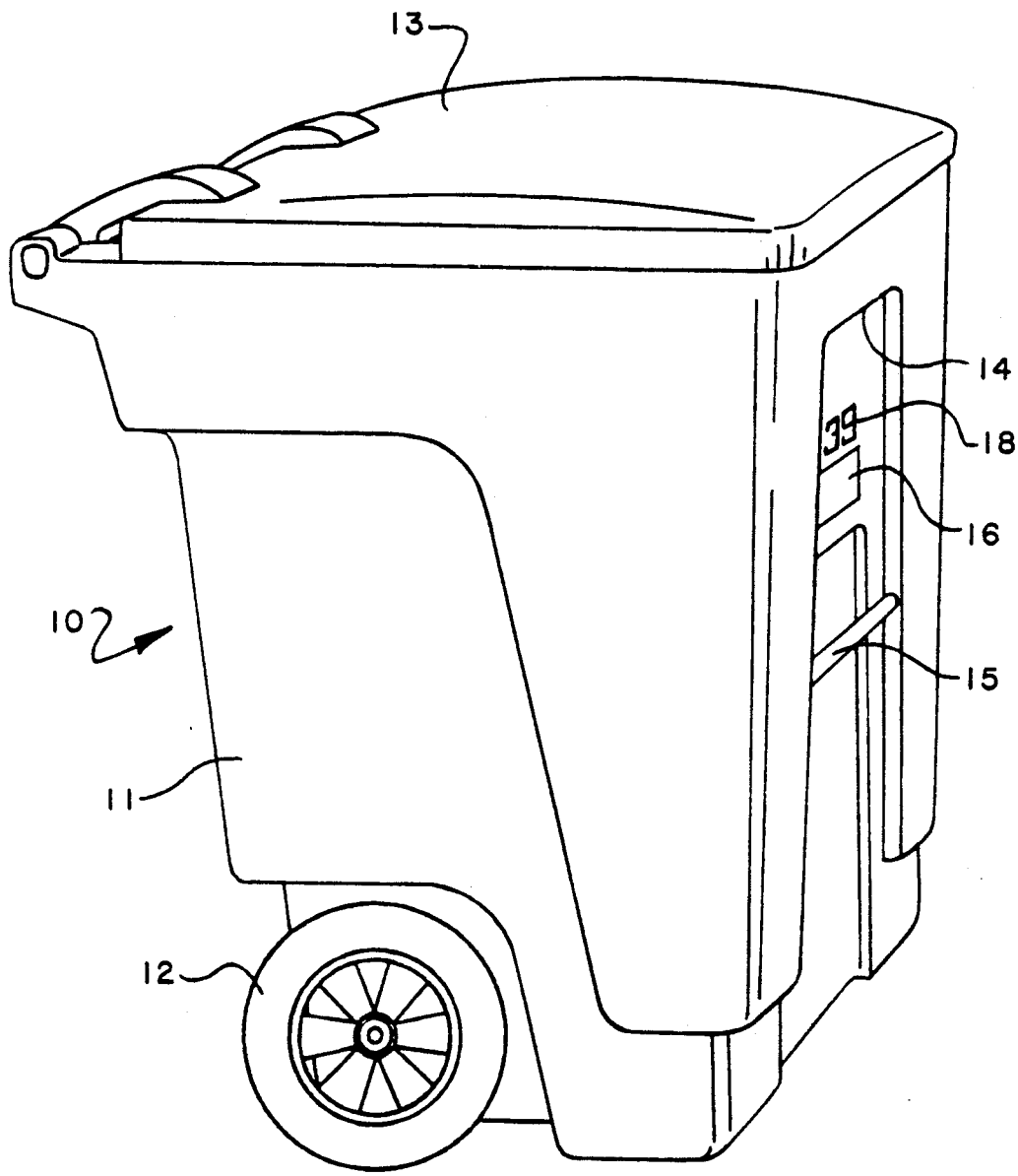
FIG. 1 is a perspective view of a roll-out refuse container of a type suitable for use with the weighing apparatus according to the invention.

Referring now specifically to the drawings, a roll-out refuse container 10 suitable for use with the weighing apparatus according to the invention is shown in FIG. 1. Refuse container 10 comprises a large body molded of lightweight plastic of a predetermined size to accommodate a desired quantity and weight of refuse. Wheels 12 (one shown) permit the container 10, which can be quite heavy when full, to be rolled about. A lid 13 is hinged to body 11 to permit the container 10 to be closed. Lid 13 is designed to fall open when the container 10 is inverted to permit the contents to fall out, and to close when the container 10 is returned to its upright position.

Container 10 includes a molded-in recess 14 and a lifting bar 15 on its front side to permit the container 10 to be placed on lifting unit, lifted, and inverted for emptying. The container 10 described above is conventional and can be lifted by different types of lifting units. Different types of refuse containers having different configurations and different types of means for attaching to and being emptied by the lifting unit are suitable for use with the invention. Under particular circumstances modifications to the lifting unit such as the one described below would be necessary.

Refuse container 10 also includes a radio frequency (RF) tag 16 which is positioned on the front of the container in a position to be read by a reader head, described below. Tag 16 is preferably totally passive. It has no batteries or other power source. The reader head "illuminates" the tag 16 by radio frequency induction, causing tag 16 to transmit to the reader head a signal representing unique data stored in the circuitry of the tag 16, such as a serial or other identifying number for the container or the like. The tag 16 may be bonded to the container 10 or embedded into the plastic sidewall of the container 10 as desired. Embedding the tag 16 renders it somewhat less noticeable and less susceptible to exposure damage and vandalism. A tag suitable for use as described above is a tag manufactured by Indala Corporation, such as HDC-21 or HDC 27.

Refuse container 10 also includes an imprinted number 18 for visual identification. This is conventional.

DESCRIPTION OF WEIGHING APPARATUS

Figure 2:
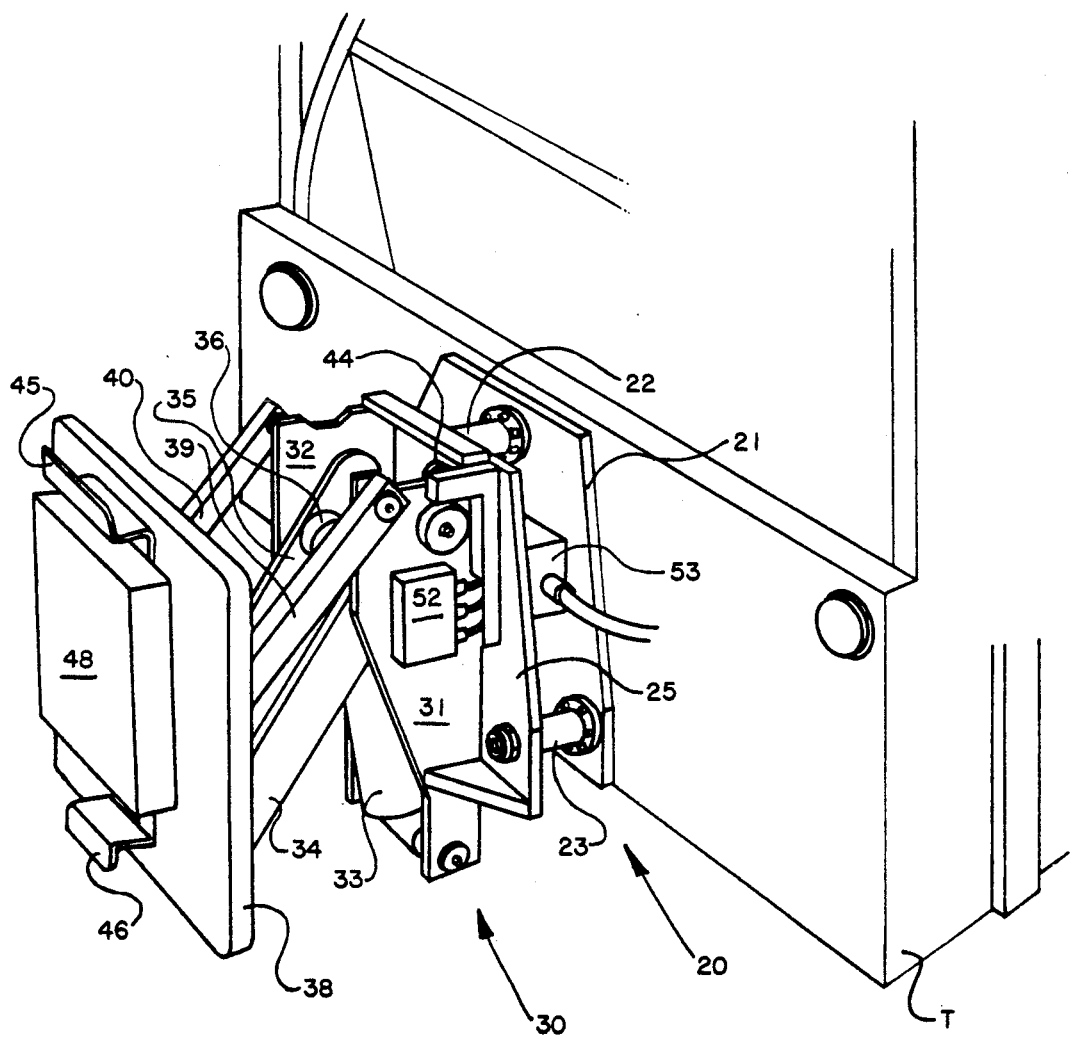
FIG. 2 is a perspective view of a weighing apparatus according to an embodiment of the invention.
Figure 3:
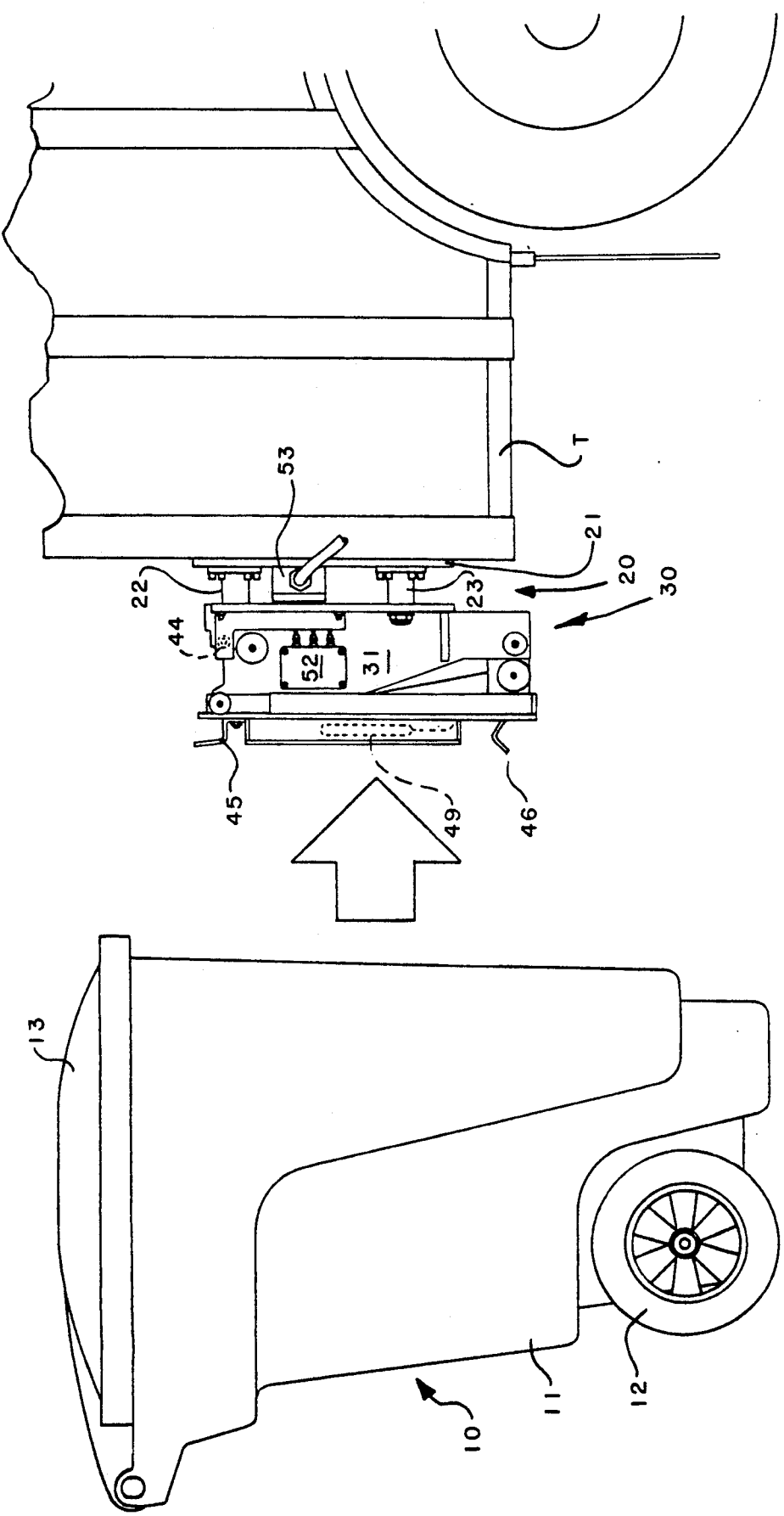
FIG. 3. is a side elevation view showing initial loading of the container onto the weighing apparatus.
Figure 4:
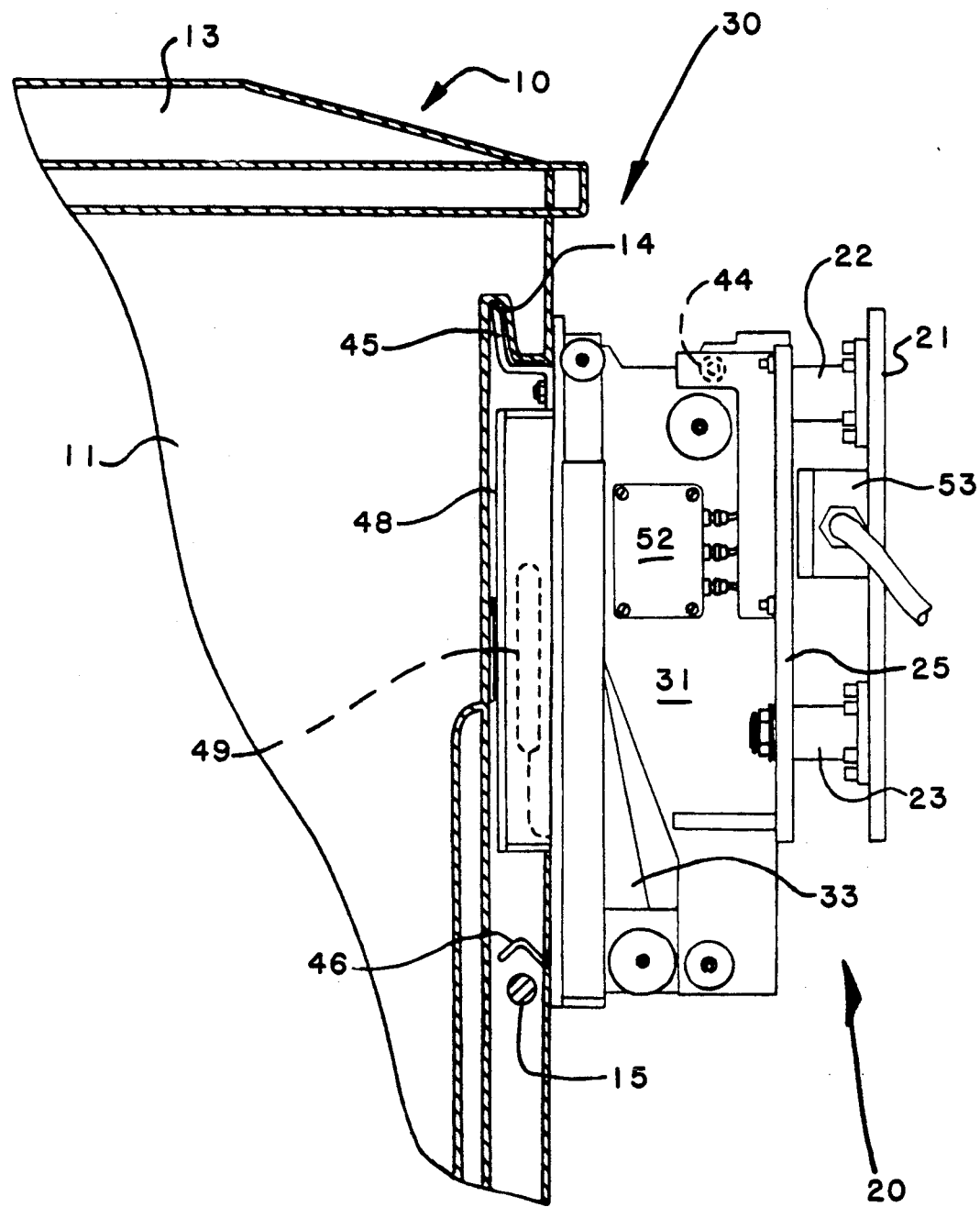
FIG. 4 is an enlarged fragmentary side elevation showing the container loaded onto the weighing apparatus in preparation for lifting.

Referring now to FIG. 2, a weighing apparatus according to an embodiment of the present invention is shown and illustrated at broad reference numeral 20. Weighing apparatus 20 is mounted on a refuse collection truck "T". This is shown schematically in FIG. 2. The actual mounting of a particular weighing apparatus 20 may be on the rear or side of truck depending on the truck type and configuration. In FIG. 2 the weighing apparatus 20 is shown mounted on the rear of the truck below a rear opening refuse collection opening into which the container 10 is inverted for emptying.

Weighing apparatus 20 includes a mounting plate 21 which is welded or bolted to a suitable mounting surface of the truck. A significant feature of the invention resides in the use of three strain gauge sensing means, comprising "weigh beams" 22, 23, 24, which are bolted to the outwardly facing side of mounting plate 21. See FIGS. 2 and 9. Theses weigh beams 22, 23, 24 are bars which extend outwardly from mounting plate 21 and act as load sensors. Strain gauges mounted on the weigh beams 22, 23 and 24 sense loads lifted with the lifter. A description of the device can be found in U.S. Pat. No. 4,421,186. Suitable devices are manufactured by Weigh-Tronix, Inc. of Fairmont, Minn. The description and explanation of operation of the devices to the extent relevant to the subject matter of this invention is incorporated herein by reference.

Electrically, the weigh beams 22, 23, 24 act as Wheatstone bridges and are connected together in parallel. Weight can be distributed in any way among the three weigh beams 22, 23, 24 without affecting the total weight sensed. The weigh beams 22, 23, 24 are designed to be insensitive to horizontal, axial and torsional loads. The manner in which this is achieved is set out in the '186 Patent referred to above.

Figure 9:
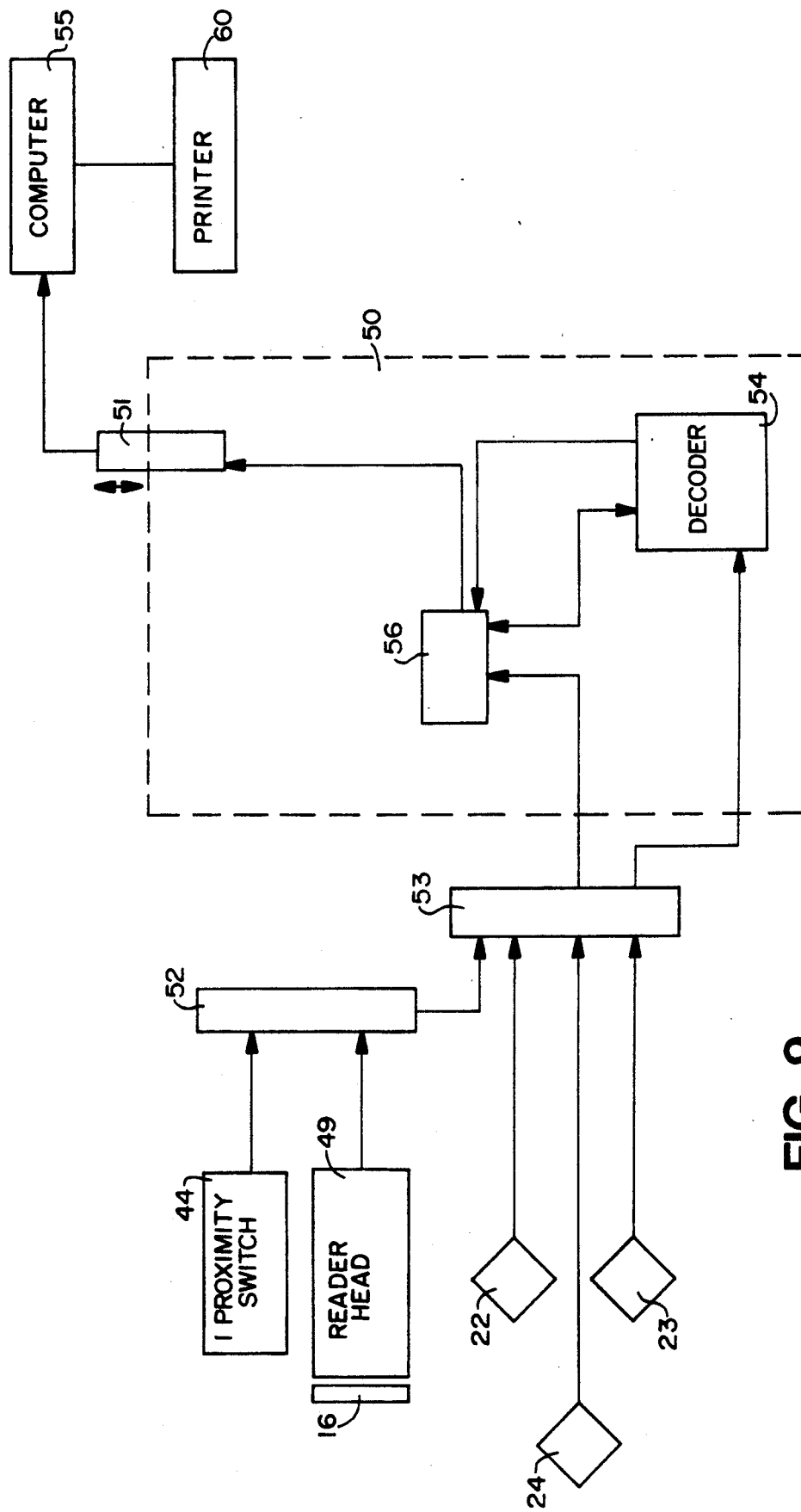
FIG. 9 is a schematic of the container weighing and identifying circuits.

The other end of the weigh beams 22, 23, 24 are threaded and connected by respective nuts to a lifter support plate 25. The attachment is very rigid, and the mounting plate 21 and lifter support plate 25 are precisely parallel to each other. The mounting is sufficiently robust that this parallel relationship is maintained while lifting loads within the capability of the weighing apparatus. For this reason, all of the deformation and strain caused by the lifting is isolated between the mounting plate 21 and lifter support plate 25, i.e., on the weigh beams 22, 23, 24. The triangular arrangement of the weigh beams 22, 23, 24 as is shown in FIGS. 2 and 9 permit all loads, whether symmetrical or asymmetrical, and regardless of torque, to be measured. This includes the weight of the lifter itself.

A lifter 30 is mounted on the lifter support plate 25. Lifter 30 includes a pair of side plates 31, 32 between which is pivotally mounted a hydraulic cylinder assembly 33. A pair of lifter arms 34, 35 are pivotally mounted by one end to respective side plates 31, 32 and by the other end to the rear surface of a container support plate 38 on which the container 10 is suspended during emptying. The lifter arms 34, 35 are actuated through a cross-bar 36 by the reciprocating extension and retraction of the hydraulic cylinder assembly 33 to lift and lower the container support plate 38 on which the container 10 is suspended.

A pair of container support plate arms 39 and 40 pivotally interconnect the side plates 31, 32 and the container support plate 38 in the manner shown in the drawings to maintain the correct angle of position of the container support plate 38 during the emptying cycle.

Figure 10:
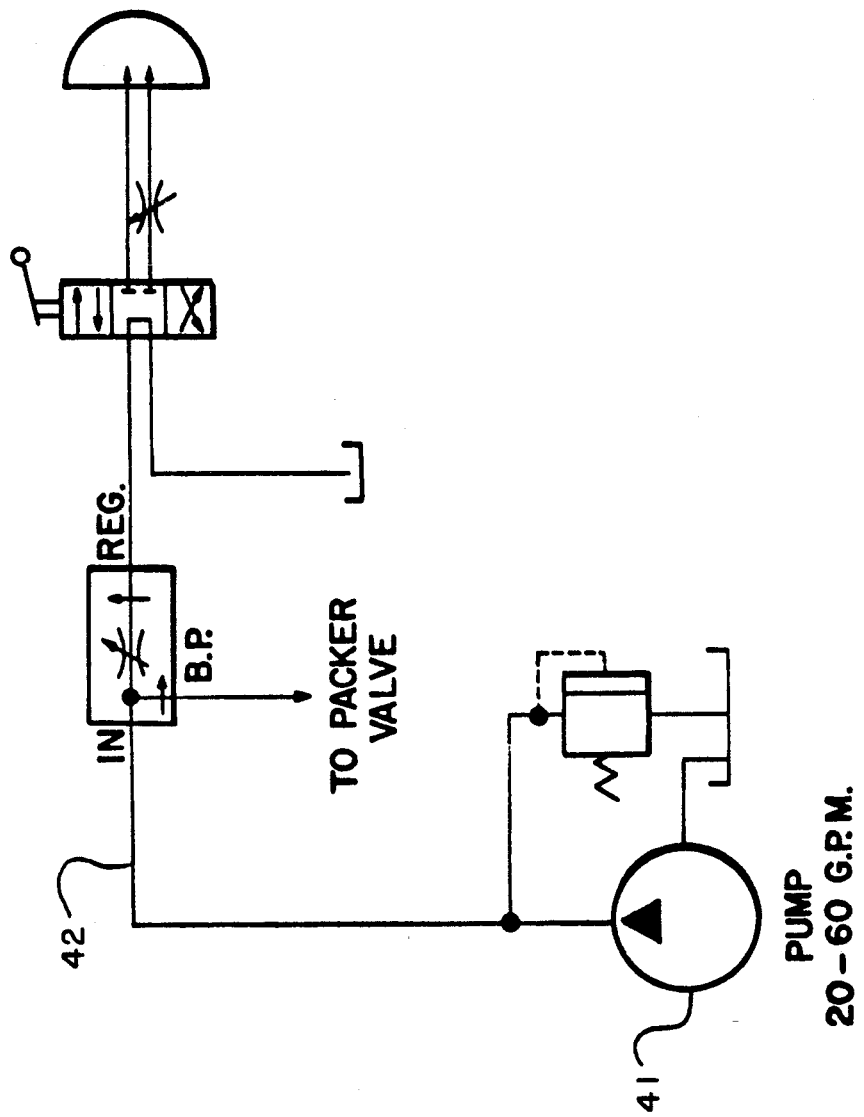
FIG. 10 is a schematic of the hydraulic circuit of the weighing apparatus.

The lifter 30 is actuated by the hydraulic cylinder 33 which is powered by a hydraulic pump 41 through a conventional hydraulic circuit 42, as is shown by reference to FIG. 10.

As will be described in further detail below, a proximity switch 4 is positioned adjacent the top edge of side plate 31. The proximity switch 44 is placed so that the actuation of the lifter 30 will move the lifter arm 34 into proximity with the proximity switch 44.

Lifter 30 is operated in a conventional manner by moving a container 10 up to the container support plate and placing an upwardly facing hook 45 into the recess 14 of the container 10. As lifting begins, a lower, downwardly facing hook 46 is lowered down onto the lifting bar 15, thus securing the container 10 onto the lifter 30. The linkage through which the motion of the hook 46 is lowered down onto the lifting bar 15 is not shown in detail, but is clearly shown and explained in Applicant's U.S. Pat. No. 4,422,814, which is incorporated herein by reference.

As the container 10 is lowered back to the ground after emptying, the hook 46 is lifted off of the lifting bar 15 in an exact reversal of the step described immediately above.

A reader head 48 is mounted on the front face of the container support plate 38. Reader head 48 is preferably a HYD-20R antenna assembly 49 (FIG. 3-7) potted within a rugged, radio frequency transparent case. When the container 10 is moved into contact with the hooks 45 and 46, the tag 16 on container 10 is approximately 1 inch from reader head 48. Antenna 49 induoes the circuitry in the tag 16 to identify itself by sending a signal to the antenna 49 Which is then transmitted to an Indala RE-2 decoder 54.

Figure 8:
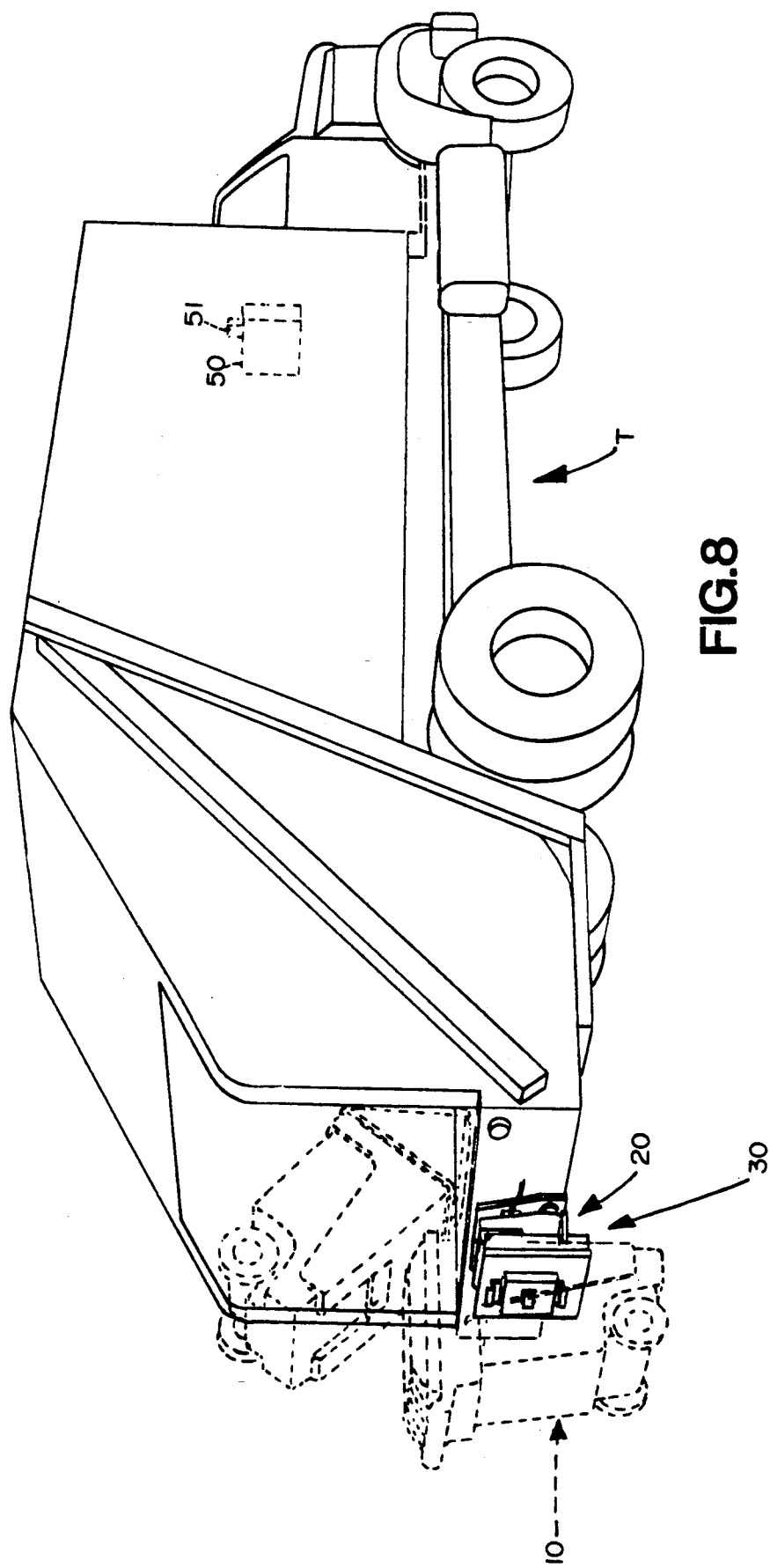
FIG. 8 is a simplified schematic view of the components of the weighing apparatus.

Referring now to FIG. 9, all signals from the weigh beams 22, 23, 24, proximity 44 switch and antenna 49 are transmitted to a microprocessor-based controller 50 for processing. Signals from the proximity switch 44 and antenna 49 are input to junction box 52 and output from junction box 52 to junction box 53. These signals are output from junction box 53 along with signals from the weigh beams 22, 23 and 24 to a controller 50. As is shown in FIG. 8, the controller 50 is preferably mounted in the cab of the truck. Controller 50 is the central intelligent device in the weighing apparatus 20. Controller 50 contains an amplifier for the weigh beams 22, 23, 24 data signals, a signal conditioner, an analog-to-digital converter, a microprocessor, display driver circuits (only if a display is included), serial input/output ports and optically isolated control input/output.

Processed information is transmitted for storage to a data storage device, preferably to an Intermec 9430 portable storage device 51. Similar devices can also be used. Storage device 51 is normally plugged into controller 50 and accepts data from controller 50 through a communications port. At the end of a shift, the storage device 51 is unplugged and the data downloaded into a computer, where further processing is carried out to arrive at a weight.

SYSTEM OPERATION

Weighing begins when a container 10 is pushed into position against the face of the container support plate 38. See FIG. 3. When properly positioned (See FIG. 4) with the front of the container 10 against the reader head 48, the lifter 30 is actuated by manual operation of the hydraulic circuit 42. During the lift/dump cycle, at actuation of proximity switch 44, the antenna 49 is activated to read tag 16. Data identifying the container 10 is transmitted from the antenna 49 to controller 50.

Figure 5:
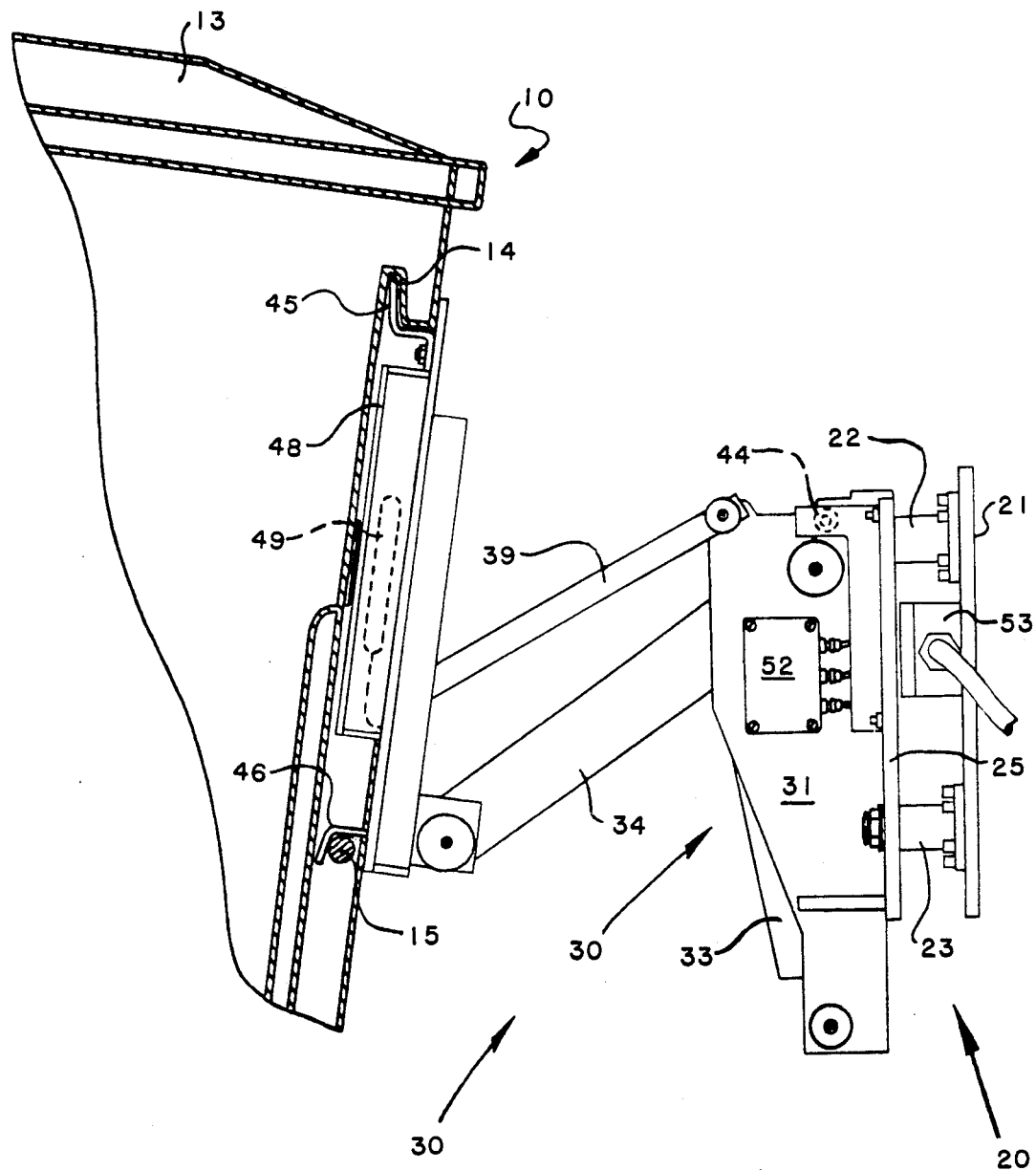
FIG. 5 is an enlarged fragmentary side elevation showing the container in an early lifting stage.
Figure 6:
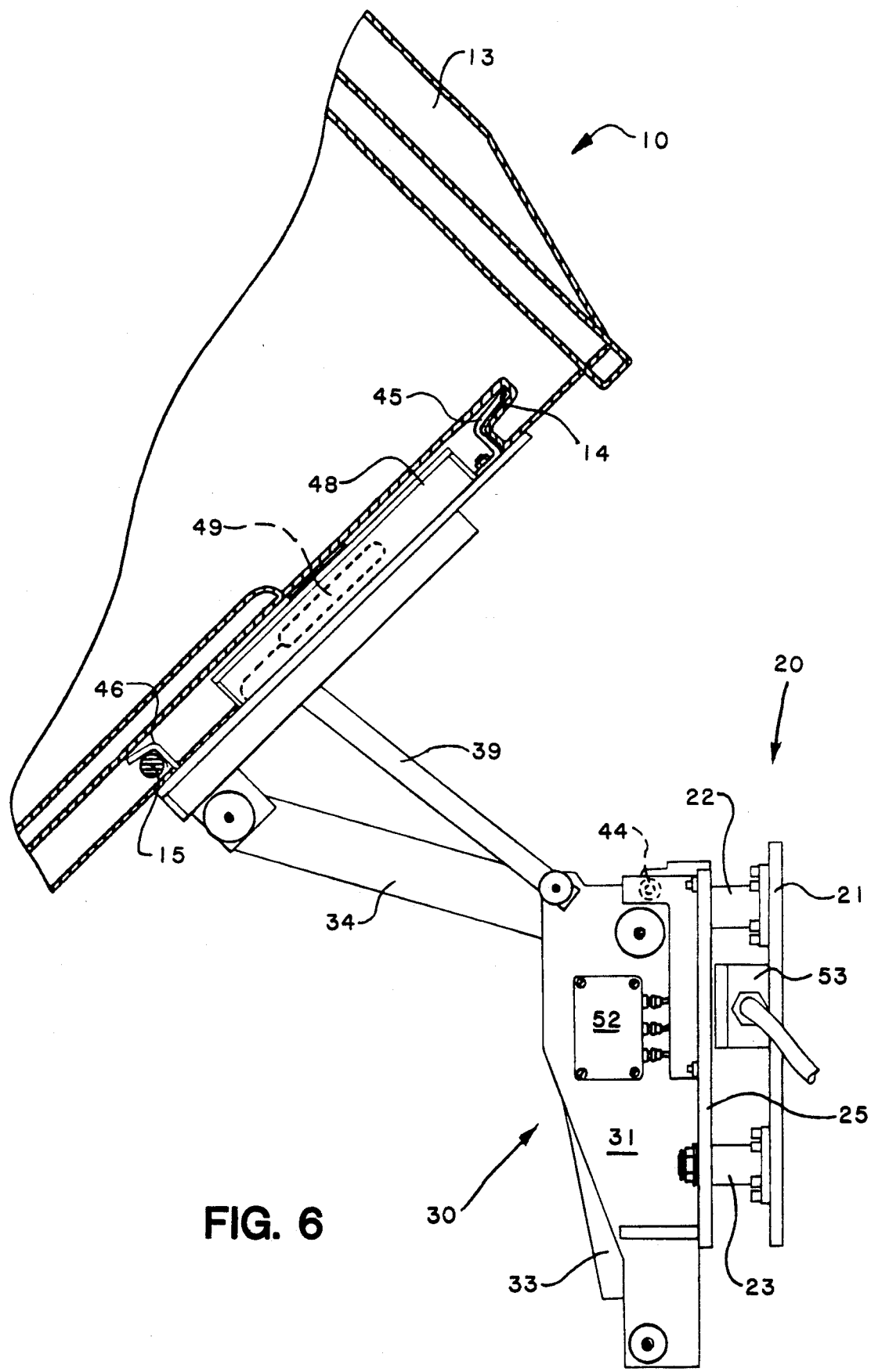
FIG. 6 is an enlarged fragmentary side elevation showing the container in an intermediate lifting stage.

Lifting begins in the manner shown in FIG. 5, as the container support plate 38 begins to rise and tilt container 10 forward towards an inverted position. The load imposed on weighing apparatus 20 by the suspended container 10 is sensed in the manner described above. Controller 50 samples the weight 25 times per second continuously and stores individual weights for later analysis and processing. At about the point in the lifting process shown in FIG. 6, the lifter arm 34 moves into sufficient proximity to the proximity switch 44 to sense a lifting cycle. This occurs at a point in the lifting cycle far enough along to ensure that the container 10 will continue through the entire cycle rather than being set back down. On sensing a lifting cycle, a selected portion of the stored weight samples are used to determine container and contents weight.

Seventeen of the weight samples are summed and represent a sample of the weight of the container 10 and the refuse contained in the container 10 on the upward, lifting part of the cycle. This value is transmitted from controller 50 to the storage device 51. Other numbers of weight samples ca also be selected and summed.

Figure 7:
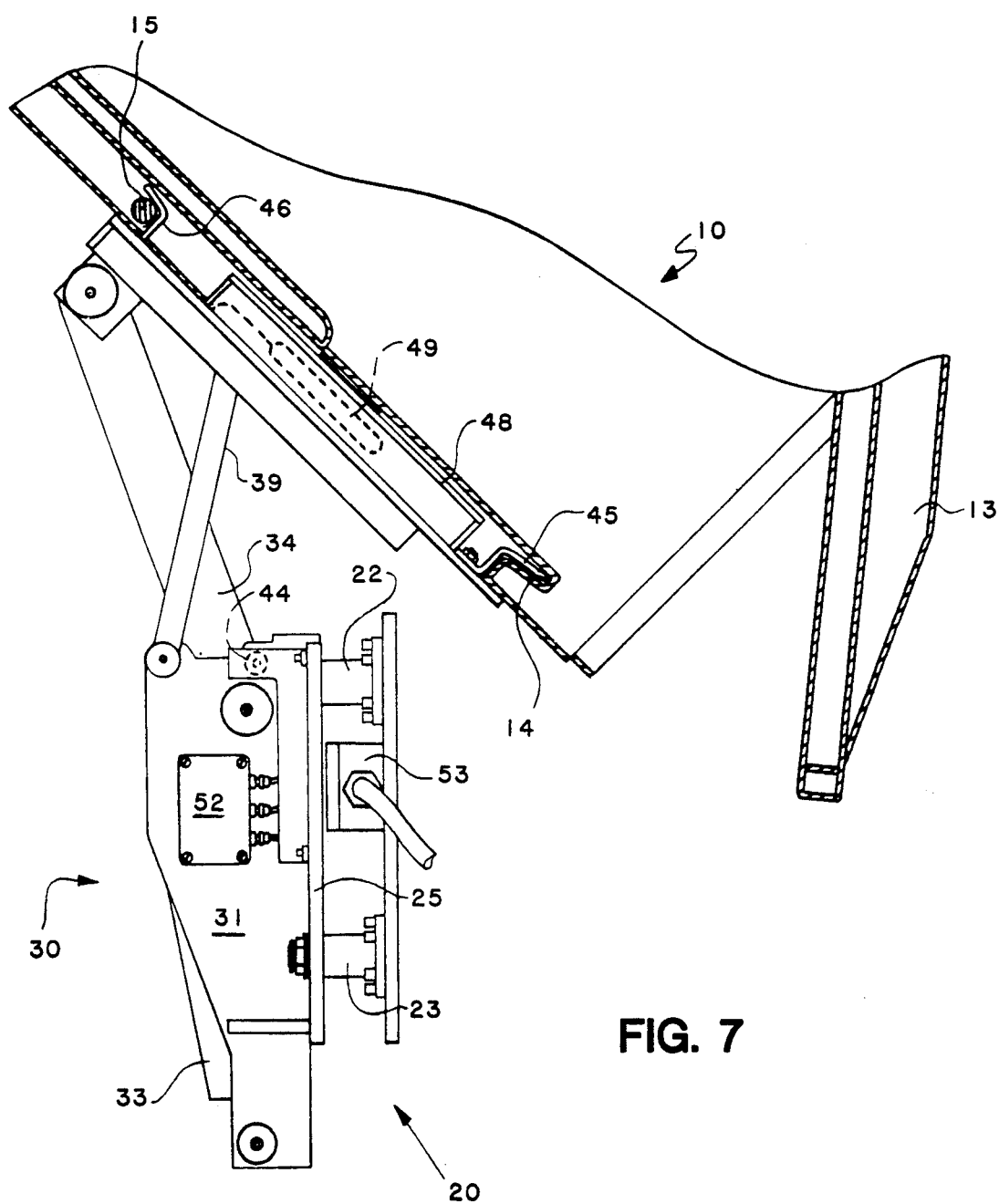
FIG. 7 is an enlarged fragmentary side elevation showing the container in the final lifting stage during which the contents are emptied.

At the position in FIG. 7, emptying of the contents of the container 10 occurs. "Banging" or "jogging" of the container 10 at the top of the cycle to dislodge sticky or jammed refuse does not affect the proximity switch 44.

As the downward movement of container 10 begins, weight sampling continues at 25 times per second. Seventeen samples are summed to derive a value representing the sum of the weight of container 10 during a predetermined segment of the down cycle. This sum is transmitted from controller to the storage device 51. The difference in the two stored values sensed represents the weight of the contents emptied from container 10. Since all of this occurs while the container 10 is in motion during the normal emptying cycle, normal efficiency is maintained. Furthermore, verification of the weight of the contents of container 10 emptied by the weighing apparatus 20 on highly accurate reference scales indicate that the weights are extremely accurate and stable.

The two sensed values (the "lifting" value and the "lowering value") and container 10 identification with time and date of the dump are stored in the storage device 51. The storage device 51 is removed from the truck and downloaded into a computer 55. Alternatively, a computer on board the truck could be used. The computer 55 divides the values by seventeen to arrive at a weight of the loaded container being lifted, for example, 200 pounds, and a weight of the emptied container being lowered, for example, 50 pounds. The "lowering" weight is subtracted from the "lifting" weight to arrive at a weight, for example, 150 pounds, representing the weight of the emptied refuse. Since the weight data is associated with the container 10 identification, the computer 55 can add as much additional information to the weight data as is associated with the container 10 information in the database. Then, a bill or statement identifying the weight and charge for collection can be printed on a printer 60 and a printed bill or receipt delivered. Truck and driver/crew utilization can also be monitored.

Figure 11:
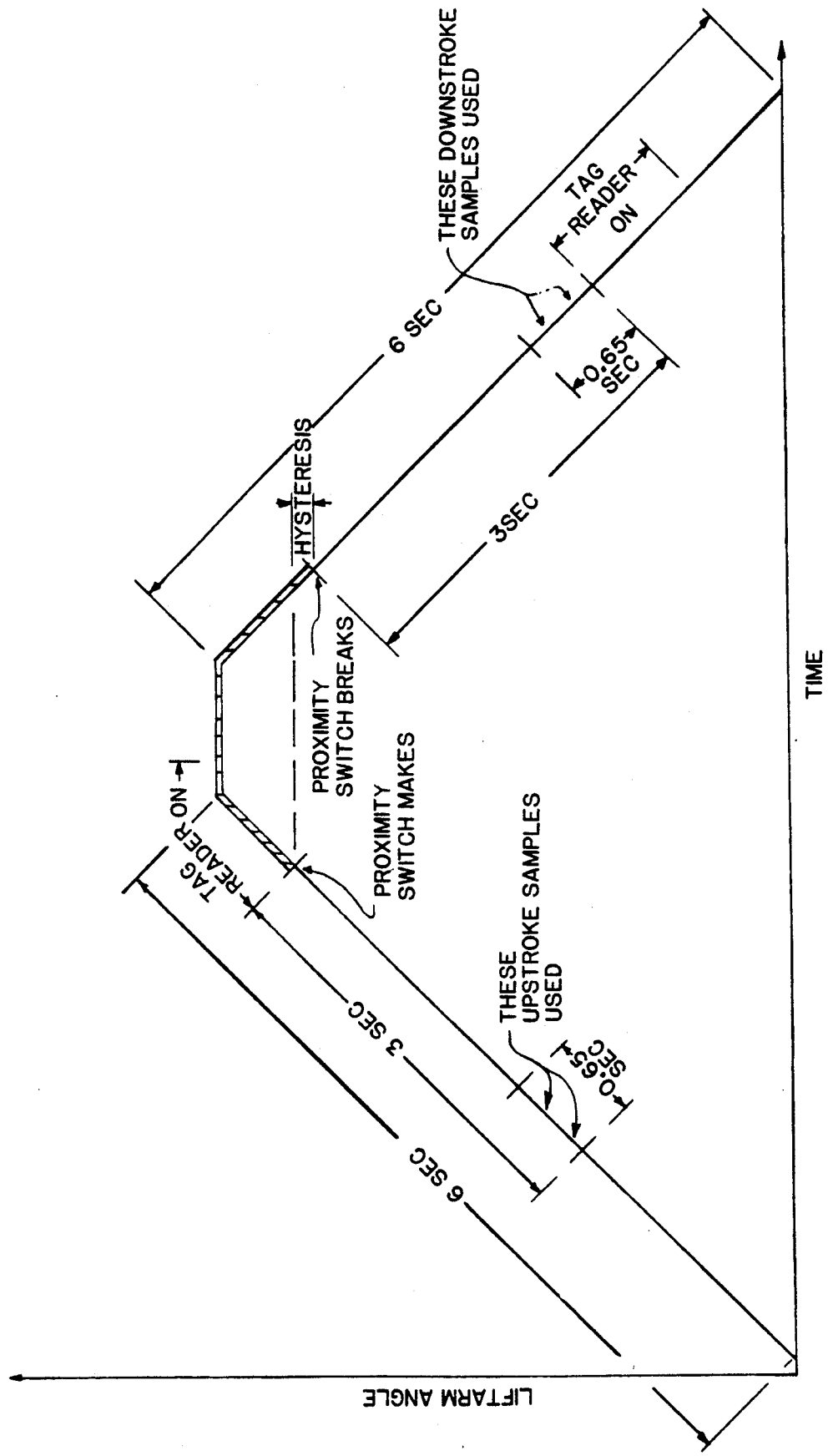
FIG. 11 is a schematic of the lifting and lowering cycle of the lifter.

A more concise and specific description of the weight calculation can best be understood by reference to FIG. 11, which plots movement of the lifter 30 as a function of time. It has been determined that the best and most reliable weight samples can be obtained in the lower range of movement of the lifter 30 during the lifting phase of the emptying cycle. This is because movement of the lifter 30 and the container 10 in the lower range of movement is very nearly vertical and the contents of the container 10 have not yet had an opportunity to shift. However, as noted above, it is desirable not to record this data until it is clear that the emptying will actually continue through to completion.

The lift requires approximately six seconds. This is shown in FIG. 11 as the time axis moves from left to right. Approximately 0.75 seconds before lift arms 34, 35 reach their maximum angle, the proximity switch 44 is turned on. This signals microcomputer 56 to go into its memory and look "backward" in time approximately three seconds earlier for weight samples obtained with the lift arm position in the lower and more optimum range of motion for weighing accuracy. Seventeen weight samples representing 0.65 seconds within this range are retrieved to generate the value from which the lifting weight will be determined, as described above.

Microcomputer 56 also turns on the tag reader 49 and encoder 54 to obtain the container's identification number. This number is combined with the lifting weight and stored in storage device 51 at approximately the time the reader 49 and encoder 54 are turned off—with the lift arms 34, 35 in the fully "up" position.

Microcomputer 56 then stands by for the proximity switch 44 to turn off. When this occurs, microcomputer 56 delays approximately three seconds, then retrieves from its memory and processes seventeen samples to form the value which represents the lowering weight, as described above. Thus, on the lowering portion of the emptying cycle, the microcomputer 56 looks "ahead" to determine the value representing the lowering weight in the lower range of the emptying cycle.

Microcomputer 56 also turns on the tag reader 49 and encoder 54 a second time to verify the identification number. This information is again collected and stored in storage device 51 at approximately the time the tag reader 49 and 54 are turned off, which is nearly back at ground level.

Other uses may be made of the weight data as well. Collection route planning can be facilitated. Landfill scales can be double checked and landfill utilization monitored. The collection trucks themselves can be monitored to prevent overloading of the trucks. Receipts can also be left with the customers as the refuse is collected, if desired.

A weighing apparatus is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A weighing apparatus for determining a weight of a load while the load is in motion, comprising:
   (a) a stationary support;
   (b) a lifter having pivot means for pivotally lifting and lowering the load through a range of simultaneous horizontal and vertical motion during the lifting and lowering motions;
   (c) weight sensing means cooperating with said stationary support and said lifter for sensing only a vertical component of the weight applied to said stationary support independent of a position of a center of mass of the load as the load is lifted in continuous, non-interrupted motion;
   (d) computing means operatively connected to said weight sensing means for receiving and processing weight information sensed by said weight sensing means and outputting data representative of the weight of the load.

2. A weighing apparatus according to claim 1, wherein said weight sensing means comprise strain gauge sensing means, and further wherein said strain gauge sensing means comprise at least three elongate weigh beams secured to said stationary support and said lifter by respective opposite ends thereof and rigidly spacing said lifter horizontally from said stationary support, said weigh beams sensing the weight of the load continuously while the load is in motion.

3. A weighing apparatus according to claim 1, wherein said lifter comprises a refuse container lifter for receiving, lifting, inverting, emptying contents from and lowering a refuse container, and wherein said lifter moves the refuse container through a range of simultaneous vertical and horizontal motion during the lifting and lowering motions.

4. A weighing apparatus according to claim 2, wherein said computing means comprises means for receiving electrical inputs from said weigh beams representative of the weight of a refuse container, determining from said electrical inputs the weight of the refuse container during lifting motion, determining the weight of the refuse container during lowering motion after contents have been emptied therefrom, subtracting the weight of the refuse container while being lowered from the weight of the refuse container while being lifted and outputting data representative of the net weight of the contents emptied from the refuse container.

5. A weighing apparatus according to claim 4, and including activating means for activating the computing means to utilize only selected weight samples obtained during only a predetermined portion of the lifting and lowering of the refuse container.

6. A weighing apparatus according to claim 5, wherein said activating means comprises a proximity switch positioned on said lifter to detect proximity of a component of the lifter positioned to be in proximity to the proximity switch during the portion of the lifting and lowering cycle to select which weight data from the weigh beams and the computing means is intended to be utilized.

7. A weighing apparatus according to claim 6, wherein said lifter includes a pair of actuator arms for moving a container support plate responsive to movement of a prime mover, and wherein said proximity switch is positioned to detect proximity of one of said actuator arms through a predetermined range of movement thereof.

8. A weighing apparatus according to claim 3, and including refuse container identifying means carried by said lifter for correlating a particular refuse container being emptied with a customer account.

9. A weighing apparatus according to claim 8, wherein said refuse container identifying means comprises a data reader for reading data from an identity tag carried by refuse containers to be emptied, and computing means includes means for receiving data from said data reader, comparing said data against a data bank of customer information and associating weight information with a customer account.

10. A weighing apparatus according to claims 3, 4, 5, 6, 7, 8 or 9, wherein said computing means samples a weight of the refuse container continuously to determine a value representing multiple weight samples and divides the value by the number of samples taken to determine a weight value.

11. A method for determining a weight of a load while the load is in vertical motion, comprising the steps of:
   (a) providing weight sensing means cooperating with a stationary support and a lifter and for sensing only a vertical component of the weight of the load continuously while the load is in uninterrupted motion;
   (b) pivotally lifting and lowering the load thorough a range of simultaneous horizontal and vertical motion;

(c) sensing the weight of the load independent of a position of a center of mass of the load; and (d) receiving and processing weight information sensed by said weight sensing means and outputting data representative of the weight of the load.

12. A method according to claim 11, wherein said lifter comprises a refuse container lifter for receiving, lifting, inverting, emptying contents from and lowering a refuse container, and wherein the step of lifting and lowering the load comprises moving the refuse container through a range of simultaneous vertical and horizontal motion during the lifting and lowering motions.

13. A method according to claim 11, wherein the step of receiving and processing weight information comprises providing electrical inputs from said weight sensing means representative of a weight of a refuse container, determining from said electrical inputs the weight of the refuse container during lifting vertical motion, determining the weight of the refuse container during vertical lowering motion after contents has been emptied therefrom, subtracting the weight of the refuse container while being lowered from the weight of the refuse container while being lifted and outputting data representative of the net weight of the contents emptied from the refuse container.

14. A method according to claim 13, and including the step of receiving and processing electrical inputs for only a predetermined portion of the lifting and lowering of the refuse container.

15. A method according to claim 14, wherein said step of receiving and processing electrical inputs comprises the step of detecting the proximity of a component of the lifter positioned to be in proximity to the proximity switch during the portion of the lifting and lowering cycle during which the computing means is intended to be operative.

16. A method according to claim 12, and including the step of correlating a particular refuse container being emptied with a customer account.

17. A method according to claim 16, wherein the step of correlating a particular refuse container with a customer account comprises reading data from an identity tag carried by refuse containers to be emptied, receiving data from said data reader, comparing said data against a data bank of customer information and associating weight information with a customer account.

18. A method according to claims 11, 12 13 14, 15 16 or 17 wherein the step of receiving and processing weight information comprises sensing the weight of the refuse container continuously to determine a value representing multiple weight samples and dividing the value by the number of samples taken to determine a weight value.

* * * * *